G. H. GIBSON.
WATER HEATING APPARATUS.
APPLICATION FILED SEPT. 4, 1909.
1,014,822.
Patented Jan. 16, 1912.
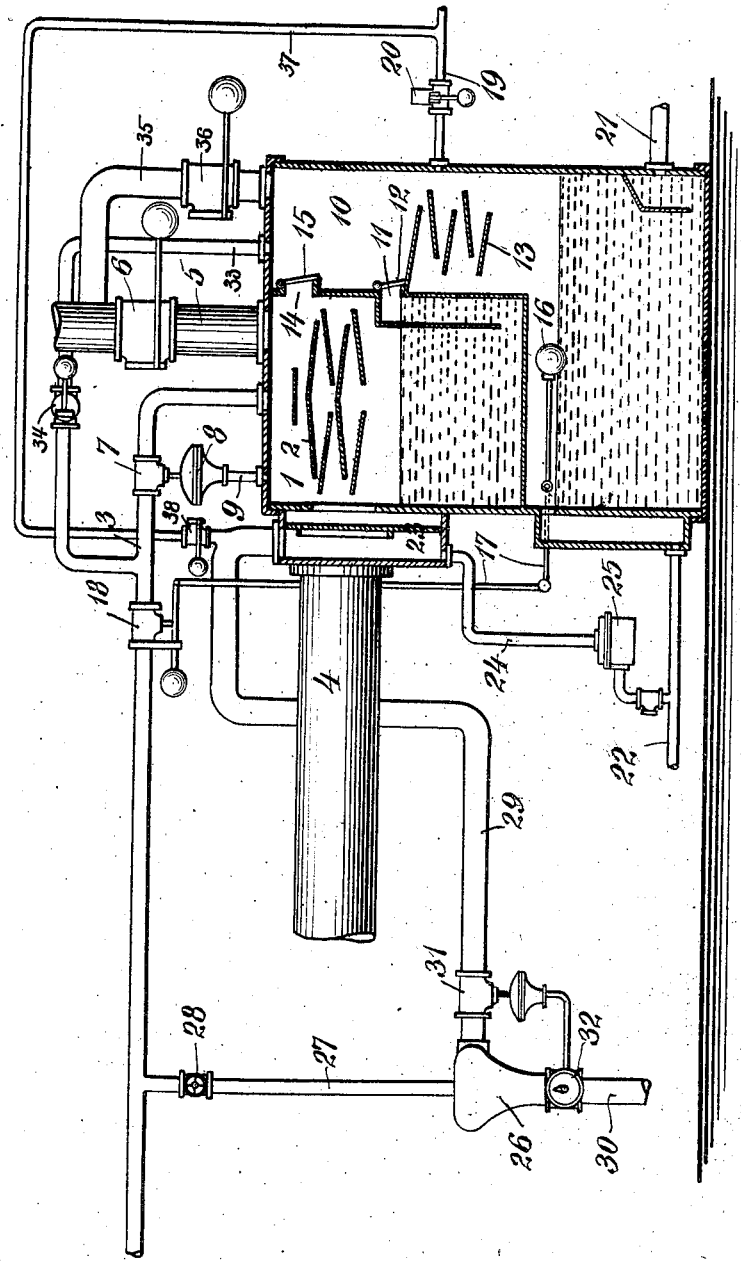
WITNESSES:
INVENTOR
BY
ATTORNEY

UNITED STATES PATENT OFFICE.

GEORGE H. GIBSON, OF MONTCLAIR, NEW JERSEY, ASSIGNOR TO HARRISON SAFETY BOILER WORKS, OF PHILADELPHIA, PENNSYLVANIA, A COPARTNERSHIP.

WATER-HEATING APPARATUS.

1,014,822.  Specification of Letters Patent.  Patented Jan. 16, 1912.

Application filed September 4, 1909. Serial No. 516,205.

*To all whom it may concern:*

Be it known that I, GEORGE H. GIBSON, a citizen of the United States, residing at Montclair, in the county of Essex and State of New Jersey, have invented certain new and useful Improvements in Water-Heating Apparatus, of which the following is a specification.

This invention relates to apparatus for heating water; and its object is to provide such an apparatus adapted for economical operation by the utilization of the heat in exhaust steam or steam blown off from a boiler for heating water preparatory to its use in a heating system or the boiler of a steam-engine.

The invention is specially directed to the provision of apparatus for use in round-houses in heating the water for washing and filling the boilers of locomotives.

In filling the boiler of a locomotive, it is desirable to use water which has been heated to a temperature at or near 212° Fahrenheit, so that as little time as possible will be lost in preparing a locomotive for service. Water at this temperature, however, cannot be used by a workman in washing a boiler, but as it is desirable to use water which has been heated somewhat in washing the boiler, it has been common heretofore to provide a supply of water at a temperature of about 130° Fahrenheit for washing.

In accordance with the present invention, an apparatus is provided whereby the heat in exhaust steam is utilized for maintaining a supply of water at a temperature of or near 212° Fahrenheit, and whereby washing water at a temperature of about 130° Fahrenheit may be obtained when required.

The invention involves the provision of a water-heater to which water and exhaust steam are admitted, so that the steam will heat the water, a second heater into which the water may overflow from the first heater, a passageway whereby steam may pass from the first heater to the second, and a live-steam connection to the second heater, arranged to supply steam to the second heater when insufficient steam is supplied thereto from the first heater, valves being arranged to prevent the passage of steam from the second heater to the first when the pressure within the former is in excess of that in the latter. In this way the water is heated in the first heater by the exhaust steam admitted thereto, and after being so heated will overflow into the second heater; but if at any time the supply of exhaust steam is insufficient to raise the temperature of the water in the first heater to that which is desired for the filling water, live-steam will be admitted to the second heater, so as to raise the temperature of the water therein to this desired temperature; however, there will be no waste of this live-steam, since it cannot flow from the second heater into the first, and therefore only enough will be used to maintain the temperature desired for the filling water.

The invention also involves the provision of a heater for heating the water which is to be employed in washing a boiler, this heater also employing exhaust steam for raising the temperature of the water passing therethrough. In the pipe for carrying exhaust steam to this heater for the washing water, an automatically-operated valve is provided, controlled by a thermostat mounted within the heater for the washing water or the pipe leading therefrom, so that the steam connection to this heater for the washing water will be opened only when steam is required for raising the temperature of the water in the heater to that which is desired for the water to be used in washing.

I have illustrated the preferred embodiment of my invention in the accompanying drawing, which shows the apparatus employed diagrammatically.

Referring to this drawing, a water-heater is shown at 1, adapted to employ steam for raising the temperature of the water admitted thereto. This heater may be of any suitable type, as, for instance, one employing means for spraying the water into the steam, but the form which I prefer to use is that employing a plurality of trays 2 over which the water may fall and through which the steam may rise, so as to impart its heat to the water and be partially or wholly condensed thereby. Cold water is supplied to the heater 1 by means of the pipe 3. Steam is supplied to the heater 1 by the pipe 4. This steam may be the exhaust from any apparatus employed on the plant which exhausts steam, as, for instance, stationary engines, and also the steam exhausted from a locomotive-boiler in emptying the same may be carried to the pipe 4 and by the latter to the heater 1.

The heater 1 is provided with an exhaust-pipe 5, having a pressure-relief-valve 6 therein, so that if the pressure within tank 1 exceeds a predetermined pressure at any time, more or less of the steam will be allowed to escape to atmosphere through the pipe 5. In the pipe 3 is a valve 7 controlling the supply of water to the heater 1, and this valve is arranged to be operated automatically in direct response to changes of pressure within the tank 1, a flexible diaphragm being provided at 8 connected to the movable member of valve 7 and the chamber on one side of this diaphragm being connected by the pipe 9 with the interior of the heater 1. Within the heater, the water flows downwardly over the trays 2, is heated by the steam passing upwardly through the trays, and collects in the water-chamber at the bottom of the heater, as shown in the drawing.

A second water-heater is shown at 10. In the drawing the heater 1 is shown as built within the structure of the heater 10, and this is the construction which I prefer to employ, though, if desired, the two heaters may be separate devices. When the water in the heater 1 rises therein above a certain level, it flows through a port 11 into the heater 10; this port 11 is provided with a non-return valve 12, so that the port is closed at all times except when the water is passing therethrough to the heater 10. Within the heater 10, the water flows downwardly over a series of trays 13 and collects in the water-chamber at the bottom of the heater. A passageway for steam from the heater 1 to the heater 10 is also provided, as shown at 14, and this passageway is also controlled by a non-return valve 15, so that the passageway is open only when steam is passing from the heater 1 into the heater 10, and if the pressure within the heater 10 is in excess of that within the heater 1 the valve 15 will be held firmly on its seat. Within the heater 10 is a float 16, which is connected by suitable levers 17 to the movable member of a valve 18 in the pipe 3 for supplying water to the heater 1. Steam is admitted to the heater 10 through a pipe 19, and in this pipe is a pressure-reducing valve 20 operating in response to changes of pressure within the heater 10, so that when the pressure within the heater falls below a certain amount the valve 20 will open and admit steam to the heater through the pipe 19. A pipe 21 connects with the water-chamber within the heater 10, so that when desired water for use in a locomotive may be withdrawn from the heater through this pipe.

A waste-pipe is shown at 22, into which the water from heater 10 may overflow. If desired, an oil-separator may be provided in the steam connection to the heater 1, as indicated at 23, and a pipe 24 may lead from this separator to the waste-pipe 22, a steam-trap 25 being inserted in this connection.

The heater for the washing water is shown at 26. This heater may be of any suitable construction, but that which I prefer to employ is one similar to a jet-condenser. This heater is connected by a pipe 27 with the cold water supply-pipe 3, a hand-operated valve 28 being inserted in the pipe 27. Steam is supplied to the heater 26 by a pipe 29, which is connected with the exhaust steam supply-pipe 4, so as to carry a portion of the exhaust steam to the heater 26. In the drawing I have shown the steam-pipe 29 as connected to the top of the casing of the separator 23, but this connection may be made to the heater 1 or to the pipe 4, as desired. Within the heater 26, the steam becomes mingled with the water admitted to the heater by the pipe 27, so that warm water passes from the heater 26 through the pipe 30. In order that this water may be at the temperature desired, means are employed for automatically regulating the amount of steam supplied to the heater 26. This regulation is secured by the provision of a valve 31 in the pipe 29, operated automatically by a thermostat 32 mounted upon the heater 26 or the pipe 30 leading therefrom, this thermostat being connected to the valve 31 so as to open the latter when the temperature of the water flowing through the pipe 30 falls, and to close the valve more or less as the temperature of this water rises.

With the apparatus constructed as above described, the operation is as follows:— Assuming that there is no water in the heaters 1 and 10, the valve 18 in the supply-pipe 3 will be opened, and if steam is carried to the heater 1 by the pipe 4 the pressure within the heater will rise sufficient to open the valve 7 so as to admit cold water to the top of the heater 1 through the pipe 3. The relief-valve 6 in the exhaust-pipe 5 will be set to open only upon an increase of pressure within the heater 1 in excess of that at which the valve 7 opens. As the water enters the heater 1, it flows downwardly over the trays 2 and takes up the heat of the steam through which it passes. This water collects in the water-chamber at the bottom of the heater 1, and when it rises to a predetermined level therein it overflows into the heater 10. Whenever the pressure within the heater 1 rises above that within the heater 10, the valve 15 will be opened, so as to allow the steam to pass into the heater 10, and this steam surrounding the trays 13 will serve to heat the water flowing down over these trays and collecting in the bottom of the heater 10. If the supply of steam to the heater 1 and from that heater to the heater 10 is insufficient to raise the pressure within the heater 10 up to such a point that the water collecting in the bottom of the heater 10 will be raised to a temperature of 212° Fahrenheit, the valve 20 will be operated automatically to admit live steam to the heater 10 through the pipe 19, and this steam will be condensed by the water within the heater 10, so as to raise the temperature of that water to the desired point. The steam admitted to the heater 10 by the pipe 19, however, cannot flow into the heater 1, for the reason that such steam will raise the pressure within heater 10 above that in heater 1, and thus close the valves 12 and 15 and hold them closed except when valve 11 opens to permit water to overflow from the heater 1 into the heater 10. It will thus be apparent that the supply of water in the bottom of the heater 10 is maintained at a temperature of or near 212° Fahrenheit, and that the heating of the water is effected within the heater 1 by the exhaust steam carried to that heater by the pipe 4, if sufficient exhaust steam is carried to the heater 1 to accomplish this; and that live steam is admitted for heating the water only when the steam passing through pipe 4 is insufficient to raise the temperature of the water admitted to the heater 10 to the desired point. The desired supply of water in tank 10 will always be maintained, by reason of the provision of the valve in the supply-pipe operated by the float within the heater. When it is desired to wash a boiler, the valve 28 is opened, so as to admit water to the heater 26, and as much steam will be admitted to this heater as is required to raise the temperature of the water passing therethrough to the desired point, by reason of the provision of the valve 31 in the steam-pipe 29 operated automatically by the thermostat 32 in response to changes of the temperature of the water passing through the heater 26.

With the apparatus constructed as above described, it might sometimes happen that the supply of water in heater 10 would fall too low due to the closure of the valve 7 for an extended period during which the steam supplied through pipe 4 was insufficient to cause valve 7 to be opened. I have therefore provided means for insuring a constant supply of water in heater 10. A pipe is shown at 33 connecting the water supply pipe 3 with the heater 10, the connection to pipe 3 being effected at a point between the valves 7 and 18 and the connection to the heater being such that the water passing through pipe 33 will fall upon the trays 13. In the pipe 33 is an automatic valve 34 opening in response to the pressure of the water thereon, this valve being loaded sufficiently to keep it closed when the valve 7 is open. Now, if the level of water in heater 10 falls, valve 18 will open and the pressure within heater 1 should open valve 7 so as to utilize exhaust steam in heating the water flowing through pipe 3; but if valve 7 is not opened, the water in pipe 3 will open valve 34 and flow through the pipe 33 into heater 10 and it will continue to do so until either valve 7 is opened or valve 18 is closed. I have also shown an exhaust pipe 35 connecting the heater 10 to the main exhaust pipe 5, a valve 36 being provided therein, in order to guard against an excessive pressure in heater 10. Since it may be desired to draw washing water at a time when no exhaust steam is flowing in pipe 4, I have provided a pipe 37 connecting the live steam pipe 19 to the pipe 29, a valve being inserted therein at 38; this valve is a pressure-reducing valve and is set to correspond to a temperature of approximately 120° F. If washing water is drawn from the heater 26 and sufficient steam is not supplied to the heater from the pipe 4 through pipe 29, valve 38 will operate automatically to admit sufficient live steam to pipe 29 and heater 26 to effect the desired heating of the water.

Having described my invention what I claim as new therein and desire to secure by Letters Patent of the United States is:

1. The combination of a heater, a pipe for carrying water thereto, means for carrying steam to the heater to heat the water therein, a valve in said water pipe operating automatically in response to predetermined conditions of steam within the heater, a second heater, a connection through which water may pass from the first heater to the second, means for admitting steam to the second heater automatically under predetermined conditions to heat the water therein and means for automatically precluding the passage of steam admitted to the second heater from that heater to the first heater, substantially as set forth.

2. The combination of a heater, a pipe for carrying water thereto, means for carrying steam to the heater to heat the water therein, a valve in said water pipe operating automatically in response to predetermined conditions of steam within the heater, a second heater, a connection through which water may pass from the first heater to the second, means for admitting steam to the second heater to heat the water therein, means for automatically precluding the passage of steam admitted to the second heater from that heater to the first heater and means for supplying fresh water to the second heater automatically under predetermined conditions from a source other than the first heater, substantially as set forth.

3. The combination of a heater, a pipe for carrying water thereto, means for carrying steam to the heater to heat the water therein, a valve in said water-pipe responsive to predetermined condition of steam within the heater, a second heater, a connection through which water may pass from the first heater to the second, a float-controlled valve in said water-pipe, a connection from said second heater to said water-pipe at a point in the latter between the float-controlled valve and the first heater, and means for admitting steam to the second heater to heat the water therein, substantially as set forth.

4. The combination of a heater, a pipe for carrying water thereto, means for carrying steam to the heater to heat the water therein, a valve in said water-pipe responsive to predetermined condition of steam within the heater, a second heater, a connection through which water may pass from the first heater to the second, a connection through which steam may pass from the first heater to the second, a non-return valve in said steam connection, a float-controlled valve in said water-pipe, a connection from said second heater to said water-pipe at a point in the latter between the float-controlled valve and the first heater, and a steam-pipe for admitting steam to the second heater to heat the water therein, substantially as set forth.

5. The combination of a heater, a pipe for carrying water thereto, means for carrying steam to the heater to heat the water therein, a second heater, connections through which steam and water may pass from the first heater to the second heater arranged to prevent the passage of steam from the second heater to the first heater, a steampipe connected to said second heater, a float in said second heater, a valve in said water-pipe controlled by said float, a second valve in said water-pipe between said float-controlled valve and the first heater and responsive to changes of conditions within the first heater, and a pipe leading to the second heater from a point in said water-pipe between the two said valves therein, substantially as set forth.

6. The combination of a heater, a pipe for carrying water thereto, means for carrying steam to the heater to heat the water therein, a valve in said water-pipe, a second heater, means for carrying steam from the first heater to the second and for allowing water to overflow from the first heater to the second, said means automatically precluding the passage of steam and water from the second heater to the first, and means for admitting steam to the second heater automatically under predetermined conditions to heat the water therein, substantially as set forth.

7. The combination of a heater, a pipe for carrying water thereto, means for carrying steam to the heater to heat the water therein, a valve in said water-pipe, a second heater, means for carrying steam from the first heater to the second and for allowing water to overflow from the first heater to the second, said means automatically precluding the passage of steam and water from the second heater to the first, a live-steam connection to the second heater and a pressure-reducing valve therein, substantially as set forth.

8. The combination of a heater, a pipe for carrying water thereto, means for carrying steam to the heater to heat the water, a second heater, a connection between the heaters so that the water may flow from the first into the second, a connection through which steam may pass from the first to the second heater, an automatically non-return valve in each of said connections, means for automatically admitting steam to the second heater when the pressure therein falls below a predetermined point, and means for admitting water to the second heater from a source other than the first heater operating automatically under predetermined conditions, substantially as set forth.

This specification signed and witnessed this 20th day of August, 1909.

GEORGE H. GIBSON

Witnesses:
D. S. EDMONDS,
HENRY MEYER.